(12) United States Patent
Chen et al.

(10) Patent No.: US 7,846,305 B2
(45) Date of Patent: Dec. 7, 2010

(54) METHOD AND APPARATUS FOR INCREASING UNIFORMITY IN ION MILL PROCESS

(75) Inventors: Pei Cheh Chen, Campbell, CA (US); Omar Eduardo Montero Camacho, Jalisco (MX); Laurence Scott Samuelson, San Jose, CA (US); Yongjian Sun, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 857 days.

(21) Appl. No.: 11/070,530

(22) Filed: Mar. 1, 2005

(65) Prior Publication Data
US 2006/0198044 A1    Sep. 7, 2006

(51) Int. Cl.
*C23C 14/34* (2006.01)

(52) U.S. Cl. ............... 204/192.34; 204/192.32; 204/298.32; 204/298.36

(58) Field of Classification Search ............ 204/192.32, 204/192.34, 298.32, 298.36
See application file for complete search history.

(56) References Cited

U.S. PATENT DOCUMENTS

| | | | |
|---|---|---|---|
| 4,384,938 A | 5/1983 | Desilets et al. | |
| 4,810,322 A | 3/1989 | Gut et al. | |
| 5,248,371 A | 9/1993 | Maher et al. | |
| 5,515,219 A * | 5/1996 | Ihrke et al. | ............... 360/236.1 |
| 5,936,800 A * | 8/1999 | Harris | ............... 360/236.9 |
| 6,132,632 A | 10/2000 | Haney et al. | |
| 6,423,240 B1 | 7/2002 | Wang et al. | |
| 6,485,990 B1 | 11/2002 | Lansford | |

FOREIGN PATENT DOCUMENTS

| | | |
|---|---|---|
| JP | 04-079220 | 3/1992 |
| JP | 04-096326 | 3/1992 |
| JP | 08-008230 | 1/1996 |
| JP | 10-012863 | 1/1998 |
| JP | 2001-007013 | 1/2001 |

* cited by examiner

*Primary Examiner*—Rodney G McDonald

(57) ABSTRACT

A method for increasing etch depth uniformity in ion milling process in a wafer manufacturing process encompasses loading designated regions of a production pallet with carriers containing wafers to be ion milled. These designated regions have been predetermined to exhibit similar and preferred depths of etching. Non-designated regions of the production pallet are then loaded with dummy carriers and the wafers are ion milled.

12 Claims, 7 Drawing Sheets

METHOD AND APPARATUS FOR INCREASING UNIFORMITY IN ION MILL PROCESS

TECHNICAL FIELD

Embodiments of the present invention relate to the field of ion milling, and more particularly to a method for increasing uniformity of depth in the ion milling of hard disk drive heads.

BACKGROUND ART

Magnetic hard disk drives (HDD) are the most widely used storage devices in the data storage industry today. The HDD uses magnetic heads that fly over a magnetic disk and read and write from and to the magnetic disk. In order for the head to fly over the disk in a predictable and stable manner, the head is incorporated in a slider body that has an air-bearing surface (ABS) facing the disk. With the appropriate ABS design, the slider can be flown very close to the disk. As devices that incorporate HDDs become smaller and smaller, the push for reducing the height at which the heads fly above the disk (fly height) is continuous. As fly heights decrease, the need for stability in their control, so as to avoid crashing into the disk, is ever increasing.

The sliders have aerodynamic features or "wings" on their ABS to allow them to fly at the appropriate height. To achieve a very low fly height without crashing, it is critical that the ABS structure satisfied design requirements with tight tolerances. Several techniques have been used to produce such an ABS, including mechanical machining, ion milling and reactive ion etching. For the more advanced ABS design, there are steps on the ABS that are less than 1 micrometer deep. Consequently, the required tolerance is much tighter than mechanical machining can deliver. Ion milling has been the choice of the process for this type of step. The technical challenge to produce such a step is to have uniformity of depth across the slider wafer.

SUMMARY

Embodiments of the present invention include a method for increasing etch depth uniformity in ion milling process in a wafer manufacturing process. The method encompasses loading designated regions of a production pallet with carriers containing wafers to be ion milled. These designated regions have been predetermined to exhibit similar and preferred depths of etching. Non-designated regions of the production pallet are then loaded with dummy carriers and the wafers are ion milled.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as to not unnecessarily obscure aspects of the present invention.

Figure 5:
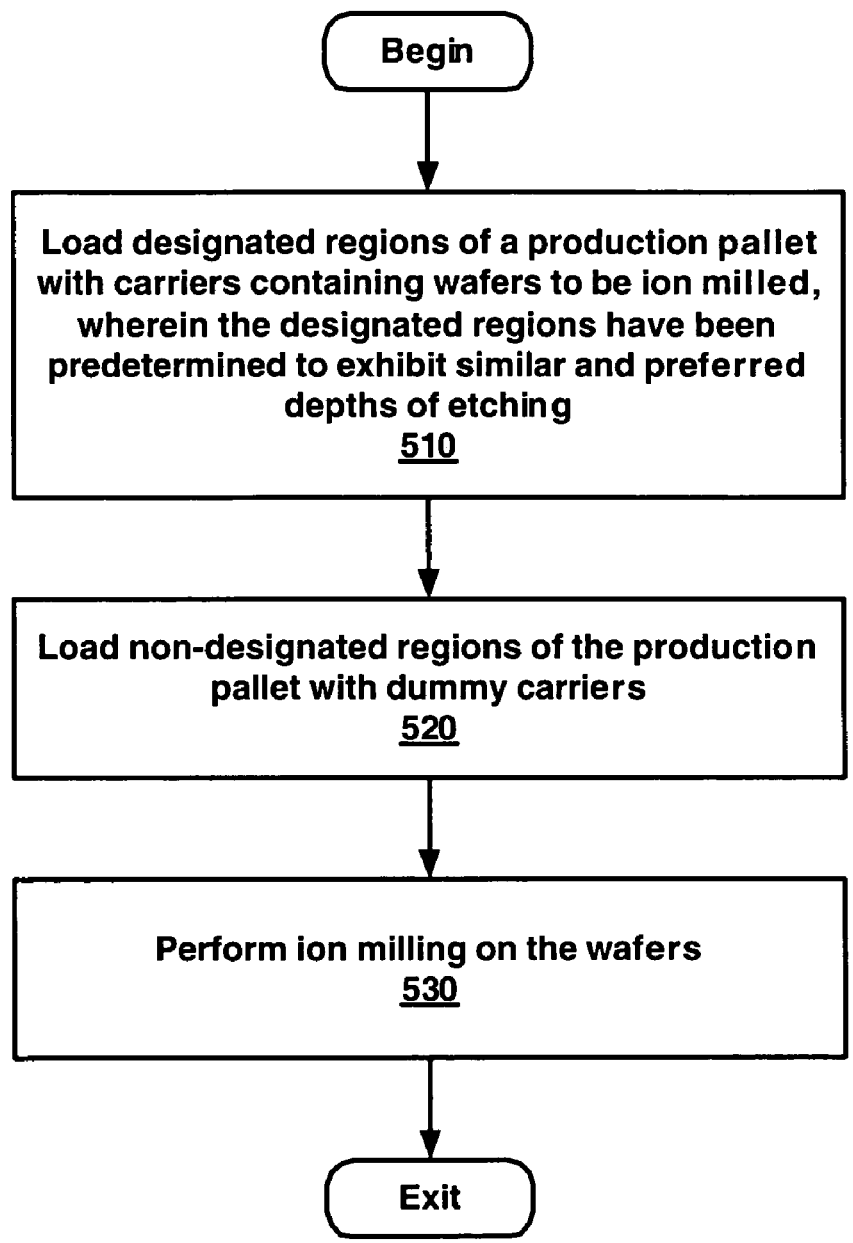
FIG. 5 is a flowchart of a method for increasing etch depth uniformity in ion mill etching of a wafer during its manufacturing process, in accordance with an embodiment of the present invention.

Certain portions of the detailed descriptions of embodiments of the invention, which follow, are presented in terms of processes and methods (e.g., method 500 of FIG. 5). Although specific steps are disclosed herein describing the operations of these processes and methods, such steps are exemplary. That is, embodiments of the present invention are well suited to performing various other steps or variations of the steps recited in the processes and methods herein.

Embodiments of the present invention include a method by which the uniformity of depth in ion mill etching can be increased in the fabrication of wafers, such as sliders for HDD heads. By increasing the uniformity of depth in sliders, for example, fly height control can be improved, which, in turn, improves the HDD yield.

Figure 1:
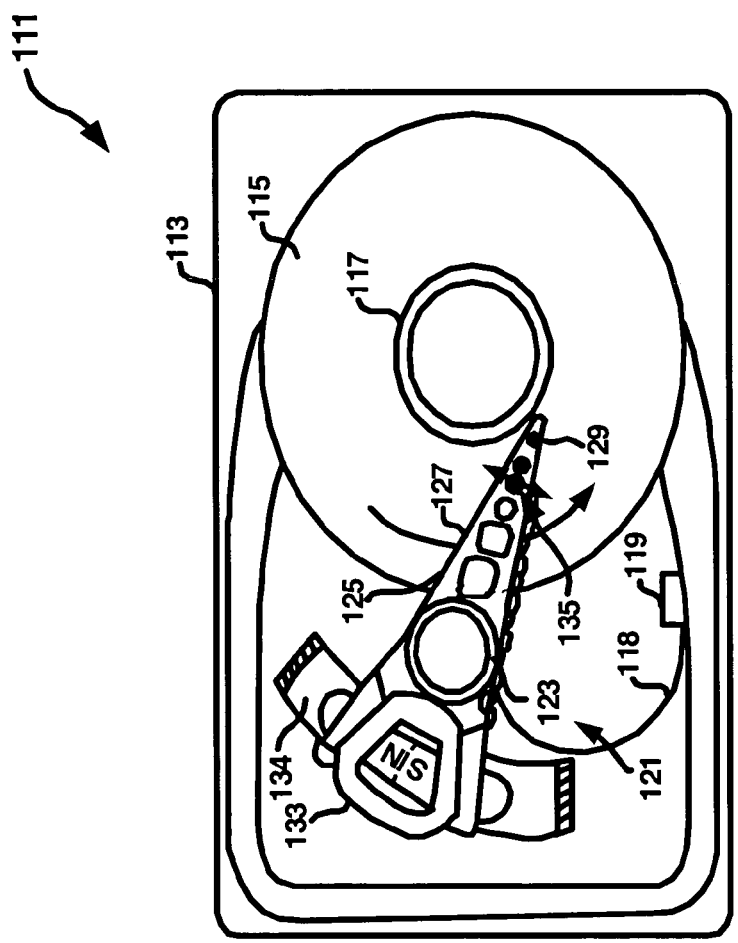
FIG. 1 is a schematic drawing of a magnetic hard disk drive or file for storing data, in accordance with an embodiment of the present invention.

FIG. 1 is a schematic drawing of one embodiment of a magnetic hard disk drive or file 111 for storing data, in accordance with the present invention. File 111 has an outer housing or base 113 containing a disk pack having at least one media or magnetic disk 115. The disk or disks 115 are rotated by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and integrated lead suspension (ILS) 127. A magnetic read/write transducer or head is mounted on a slider 129 and secured to a flexure that is flexibly mounted to each ILS 127. The read/write heads magnetically read data from and/or magnetically write data to disk 115. The level of integration called the head gimbal assembly is the head and the slider 129, which are mounted on suspension 127. The slider 129 is usually bonded to the end of ILS 127.

ILS 127 has a spring-like quality, which biases or presses the air-bearing surface of the slider 129 against the disk 115. Features, sometimes referred to as "wings," on the air-bearing surface (ABS) of slider 129 are designed to cause the slider 129 to fly at a precise distance (fly height) from the disk. In order to maintain the maximum control of the fly height, it is important that the wings on the ABS have precise and uniform depths. These wings may be formed using an ion mill etch process. According to embodiments of the present invention, the ion mill etch process can be performed on wafers containing sliders that are located in designated positions on a production pallet, wherein the designated positions have been predetermined to exhibit preferred and uniform depths of etching.

ILS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless file 111 uses multiple independent actuators (not shown) wherein the arms can move independently of one another.

Figure 2A:
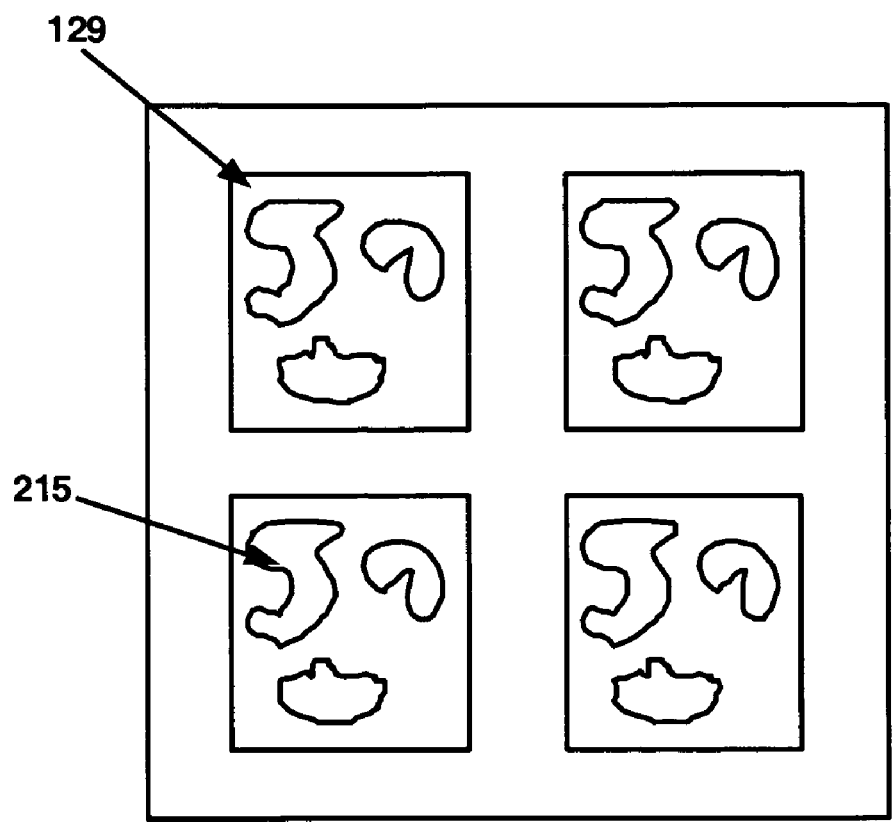
FIG. 2A illustrates a carrier containing slider wafers with ion-milled features on their air-bearing surface for controlling fly height, in accordance with an embodiment of the present invention.

FIG. 2A illustrates a carrier 200a containing slider wafers 129 with ion-milled features 215, sometimes referred to as "wings," on their ABS for controlling fly height, in accordance with an embodiment of the present invention. Features 215 are designed to cause the slider 129 to fly at a precise fly height (e.g., fly height 225 of FIG. 2B) above a disk. In order to maintain the maximum control of the fly height, it is important that the wings 215 on the ABS have precise and uniform depths. These wings 215 may be formed using an ion mill etch process. According to embodiments of the present invention, the ion mill etch process can be performed on wafers or sliders 129 that are located in designated positions on a production pallet, wherein the designated positions have been predetermined to exhibit preferred and uniform depths of etching.

Although carrier 200a is shown to contain four slider wafers, it should be understood that a carrier may contain a single wafer, or any number of wafers, depending on the size and design of the carrier 200a. It should also be understood that, although the present embodiment refers specifically to wafers that are sliders for HDD heads, it may also apply to any wafers fabricated using ion mill etching and having a need for precise, uniform depth of etching.

Figure 2B:
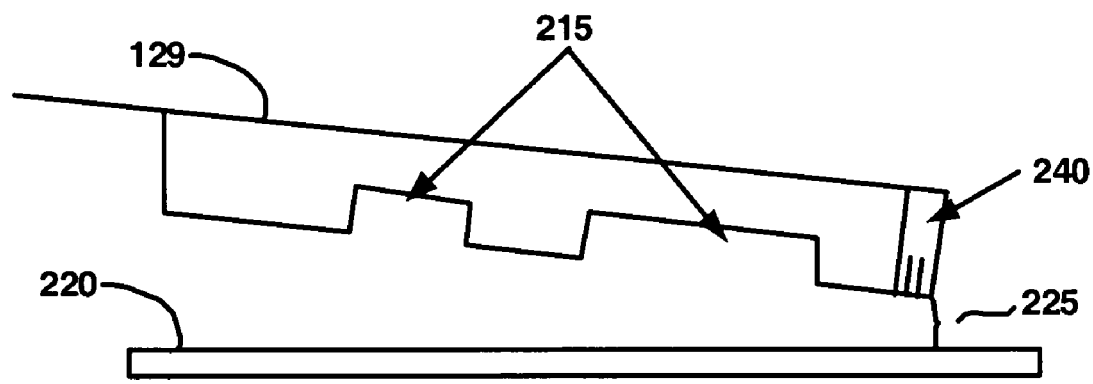
FIG. 2B is a side view 200b of a slider having a read/write head and flying above a disk surface, in accordance with one embodiment of the present invention.

FIG. 2B is a side view 200b of a slider 129 having a read/write head 240 and flying above disk surface 220, in accordance with one embodiment of the present invention. The features 215 of the ABS affect control of how slider 129 rides above the read/write surface 220 of the disk. The height 225 at which read/write head 240 rides above disk surface 220 is known as the fly height. As fly heights, e.g. fly height 225, become smaller and smaller, the control of the fly height, as provided by features 215, becomes more and more critical. If the fly height becomes zero, the head "crashes" into the disk and is rendered defective. This has a negative impact on the HDD yield. Therefore, if the control of the fly height can be improved, the HDD yield can be improved.

Figure 3:
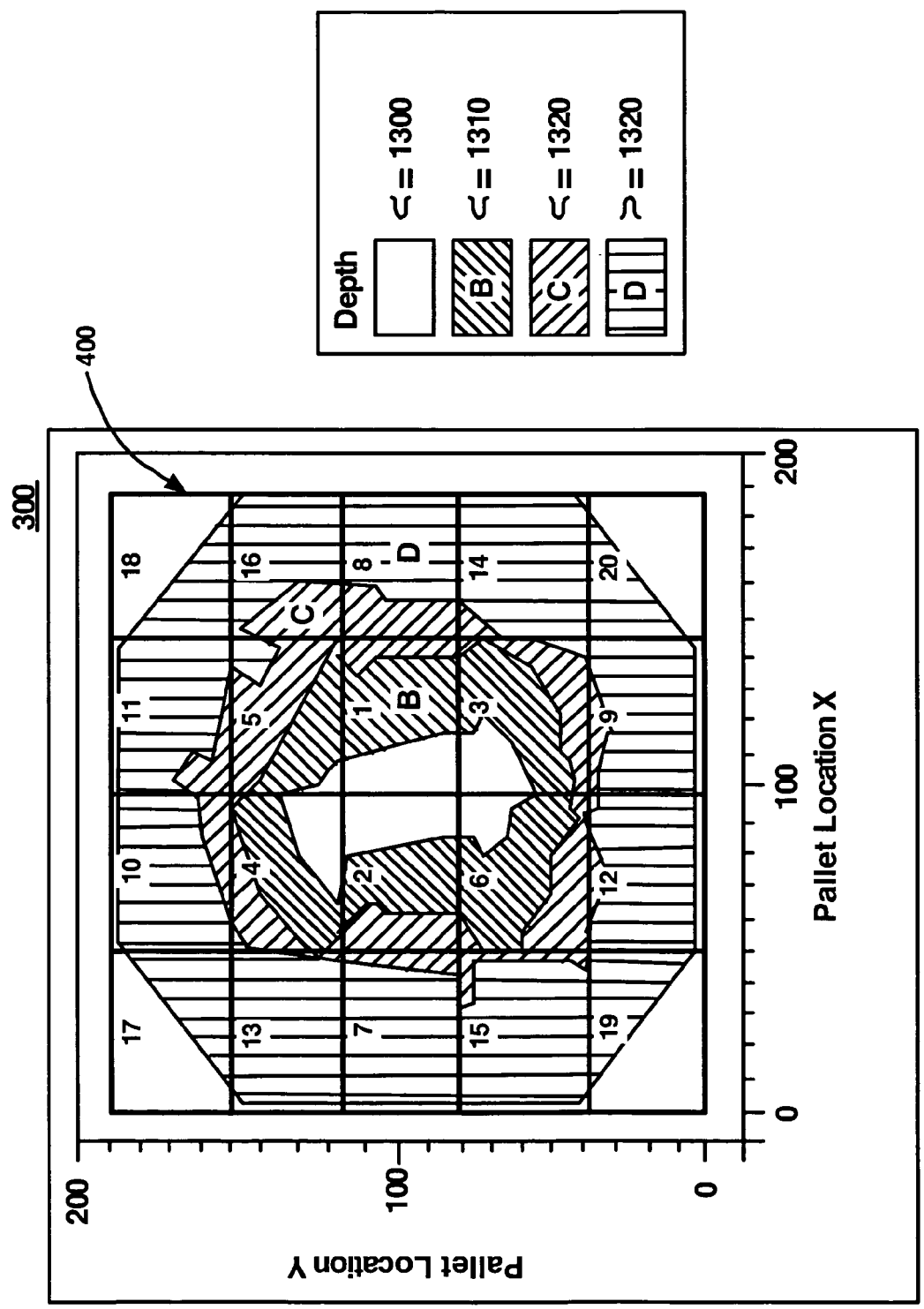
FIG. 3 is a contour plot of ion mill etch depths across a production pallet, in accordance with an embodiment of the present invention.

FIG. 3 is a contour plot 300 of ion mill etch depths across a production pallet 400, in accordance with an embodiment of the present invention. Multiple test runs were performed over a three month period using three distinct production tools. Each tool had a pallet 400 that was loaded with carriers containing wafers to be ion mill etched. A pallet having a 4×5 carrier array capacity was used for process runs, each carrier occupying one of regions 1 through 20. Regions 17-20 were not used, as they occupy corners of pallet 400 that do not receive a complete etch. In the remaining regions 1-16, the carriers contained sliders for hard disk drives that were ion milled. The ion mill etch depths were measured and the results are shown as contours A through D, having etch depths ranging from <1300 to >1320.

The distribution of ion mill etch depths obtained from the test run results were sorted by pallet regions, with each region having its own mean and standard deviation. The mean of the individual pallet region means was computed to determine the overall population outgoing mean. The mean of the region standard deviations was computed to determine the location to location variation across the pallet. The standard deviation of the pallet region standard deviations was measured to determine the run-to-run etch uniformity, and the standard deviation of the individual region means was measured to determine the within-run etch uniformity. The results indicated that contour D, which occupies most of regions 7 through 16 results in preferred etch depths that are relatively uniform.

Figure 4:
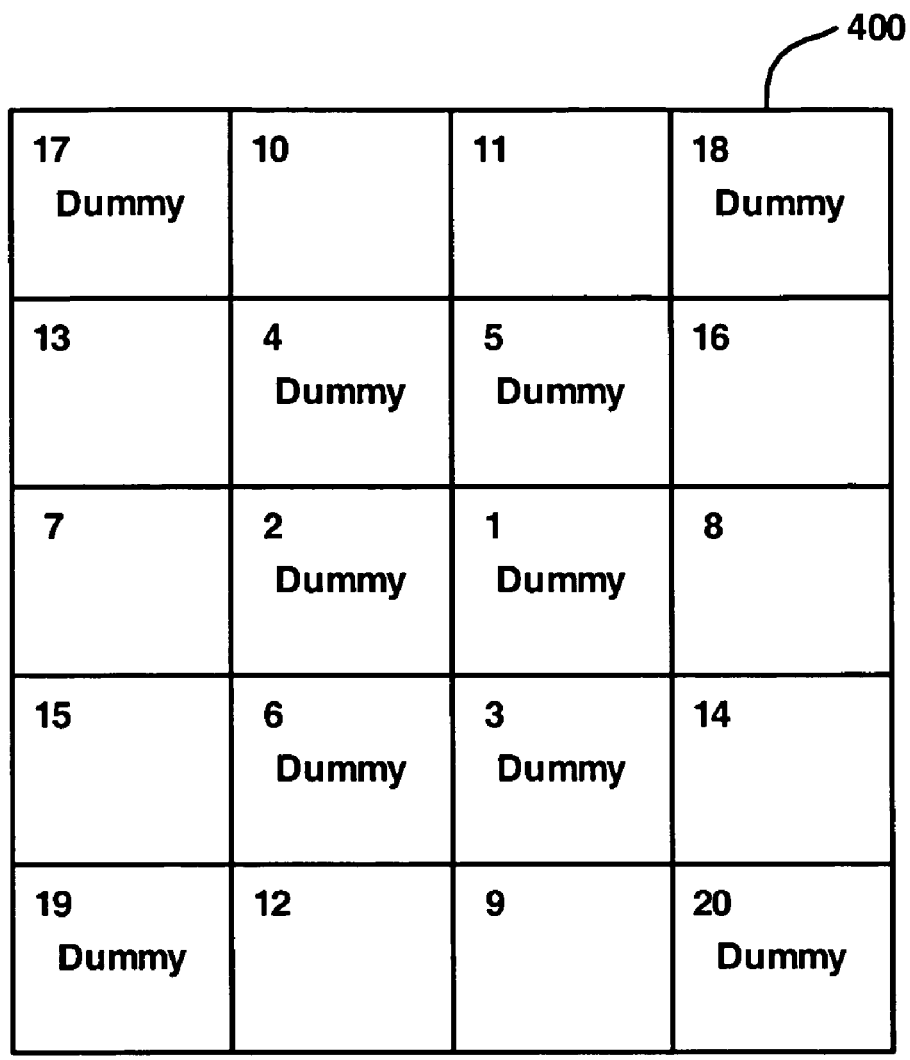
FIG. 4 is an illustration of a production pallet showing designated regions for ion milling slider wafers and dummy regions which are not designated for ion milling wafers, in accordance with an embodiment of the present invention.

Based on these results, according to an embodiment of the present invention, regions 7 through 16 are designated as areas to receive wafers for ion milling, and regions 1 through 6 receive dummy wafers as shown in FIG. 4. It is determined that by not ion mill etching slider wafers in regions 1 through 6, the percent HDD yield loss has been reduced by 0.2% to 0.5% per head. This is due to improved fly height control resulting from uniformity of etch depth in the features on the ABS of the sliders. It was also determined that both the run-to-run etch depth uniformity and the within-run etch depth uniformity were increased.

FIG. 4 is an illustration of a production pallet 400 showing designated regions 7-16 for ion mill etching of slider wafers and dummy regions 1-6 and 17-20 which are not designated for ion mill etching of wafers, in accordance with an embodiment of the present invention.

FIG. 5 is a flowchart of a method 500 for increasing etch depth uniformity in ion mill etching of a wafer during its manufacturing process, in accordance with an embodiment of the present invention.

At step 510, designated regions (e.g., regions 7-16 of FIG. 4) of a production pallet are loaded with carriers containing wafers to be ion milled, according to an embodiment of the present invention. The designated regions have been predetermined to exhibit similar and preferred depths of etching, as described in conjunction with FIG. 3 above.

At step 520 of method 500, non-designated regions (e.g., regions 1-6 and 17-20 of FIG. 4) of the production pallet are loaded with dummy carriers, in accordance with one embodiment of the present invention. These non-designated regions have been shown to exhibit variations in depth of etch that are undesirable.

At step 530, ion mill etching is performed on the wafers located in the designated regions, in accordance with an embodiment of the present invention.

Figure 6:
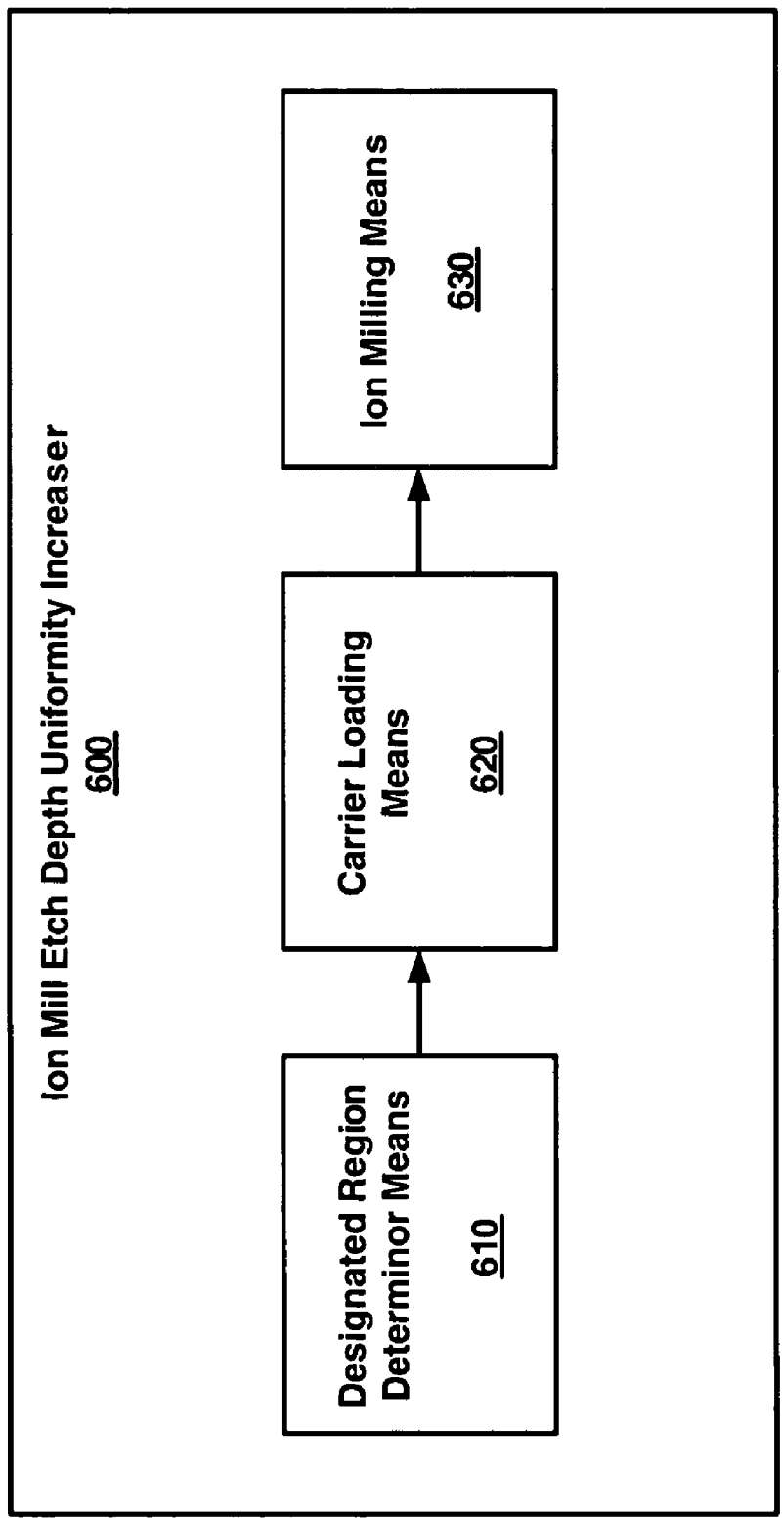
FIG. 6 is a block diagram of an ion mill etch depth uniformity increaser, in accordance with one embodiment of the present invention.

FIG. 6 is a block diagram of an ion mill etch depth uniformity increaser 600, in accordance with one embodiment of the present invention. Ion mill etch depth uniformity increaser includes a designated region determiner means 610 for determining designated regions of a production pallet in which to load carriers with wafers to be ion mill etched. The designated regions have been predetermined to exhibit similar and preferred depths of etching. By exhibiting similar and preferred depths of etching, fly height control for the hard disk drive heads may be improved.

According to one embodiment, carrier loading means 620 is for loading the carriers comprising wafers to be ion mill etched, based on output from designated region determiner means output, into the designated regions of the production pallet and for loading carriers containing dummy wafers into non-designated regions of the production pallet.

Ion milling means 630 is for ion mill etching the wafers to be ion milled, in accordance with one embodiment of the present invention. In one embodiment, the wafers to be ion milled may be sliders for hard disk drive heads. In another embodiment, the wafers to be ion milled may be wafers for any device that is fabricated using ion mill etching and that has a need for precise, uniform depth of etching.

Thus, the present invention provides, in various embodiments, a method and apparatus for increasing etch depth uniformity in ion milling process in a wafer manufacturing process. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for increasing etch depth uniformity in ion mill etching of a wafer during its manufacturing process, said method comprising:
    loading designated regions of a production pallet with carriers containing wafers to be ion milled, wherein said designated regions have been predetermined to exhibit similar and preferred depths of etching, wherein said loading designated regions comprises:
    performing multiple process runs;
    determining HDD yield loss per HDD head based on said performing multiple process runs; and
    determining locations of said designated regions exhibiting similar and preferred depths of etching based on said determining HDD yield loss and results of said multiple process runs;
    loading non-designated regions of said production pallet with dummy carriers based on said determining locations of said designated regions; and
    performing said ion milling on said wafers.

2. The method as recited in claim 1 wherein loading non-designated regions of said production pallet with dummy carriers further comprises:
    for a pallet containing 20 regions in a four-by-five array, loading four corner regions and six central regions with said dummy carriers.

3. The method as recited in claim 1, wherein said wafers comprise hard disk drive heads.

4. The method as recited in claim 3, wherein said increasing etch depth uniformity in ion milling process for wafers further comprises:
    improving fly height control for said hard disk drive heads.

5. The method as recited in claim 1, wherein said increasing etch depth uniformity further comprises:
    increasing both run-to-run uniformity and within-run uniformity.

6. An apparatus for increasing etch depth uniformity in an ion mill process, said apparatus comprising:
    a production pallet;
    a plurality of wafer carriers, said wafer carriers disposed within designated regions of said production pallet, wherein wafers to be ion milled are loaded into said designated regions, said designated regions having been predetermined to exhibit similar and preferred depths of etching, wherein said loading designated regions comprises:
    performing multiple process runs;
    determining HDD yield loss per HDD head based on said performing multiple process runs; and
    determining locations of said designated regions exhibiting similar and preferred depths of etching based on said determining HDD yield loss and results of said multiple process runs;
    and wherein dummy wafers are loaded into non-designated regions based on said determining locations of said designated regions.

7. The apparatus as described in claim 6 wherein non-designated regions in a pallet containing 20 regions in a four-by-five array comprise four corner regions and six central regions.

8. The apparatus as described in claim 6, wherein said wafers to be ion milled comprise sliders for hard disk drive heads.

9. The apparatus as described in claim 8, wherein said increasing etch depth uniformity in ion milling process results in improved fly height control for said sliders.

10. A ion mill etch depth uniformity increaser comprising:
    designated region determinor means for determining designated regions for loading carriers comprising wafers to be ion mill etched into a production pallet, wherein said designated regions exhibit similar and preferred depths of etching, wherein said determining designated regions for loading carriers comprises:
    performing multiple process runs;
    determining HDD yield loss per HDD head based on said performing multiple process runs; and
    determining locations of said designated regions exhibiting similar and preferred depths of etching based on said determining HDD yield loss and results of said multiple process runs;
    carrier loading means, receiving output from said designated region determinor means, for loading said carriers comprising wafers to be ion mill etched into said designated regions of said production pallet based on said output and for loading carriers containing dummy wafers into non-designated regions of said production pallet based on said determining locations of said designated regions; and
    ion milling means coupled to said carrier loading means for ion mill etching said wafers to be ion milled.

11. The ion mill etch depth uniformity increaser as described in claim 10, wherein said wafers to be ion milled comprise sliders for hard disk drive heads.

12. The ion mill etch depth uniformity increaser as described in claim 11, wherein said exhibiting similar and preferred depths of etching results in improved fly height control for said hard disk drive heads.

* * * * *